(12) United States Patent
Saito

(10) Patent No.: US 7,573,166 B2
(45) Date of Patent: Aug. 11, 2009

(54) ROTARY ELECTRIC MACHINE EQUIPPED WITH BEARING STRUCTURE PROVIDING ENHANCED RESISTANCE TO THRUST LOAD

(75) Inventor: Tatsuya Saito, Chiryu (JP)

(73) Assignee: Denso Corporation, Kariya (JP)

( * ) Notice: Subject to any disclaimer, the term of this patent is extended or adjusted under 35 U.S.C. 154(b) by 402 days.

(21) Appl. No.: 11/403,934

(22) Filed: Apr. 14, 2006

(65) Prior Publication Data

US 2006/0232153 A1    Oct. 19, 2006

(30) Foreign Application Priority Data

Apr. 15, 2005    (JP)    ............................. 2005-118212

(51) Int. Cl.
*H02K 5/16* (2006.01)
(52) U.S. Cl. .......................................... 310/90; 310/89
(58) Field of Classification Search .............. 310/89–90
See application file for complete search history.

(56) References Cited

U.S. PATENT DOCUMENTS 4,409,505 A * 10/1983 Petersen ...................... 310/90
5,079,465 A *  1/1992 Schmidt et al. ............... 310/90

FOREIGN PATENT DOCUMENTS

JP    A 11-141443    5/1999

* cited by examiner

*Primary Examiner*—Thanh Lam
(74) *Attorney, Agent, or Firm*—Oliff & Berridge, PLC

(57) ABSTRACT

A rotary electric machine which may be used as a starter motor in an engine starter. The rotary electric machine includes a bearing which retains an armature shaft rotatably. The bearing is implemented by a plain bearing made of a sleeve and placed in contact of one of opposed ends of an axial length thereof with a shoulder formed on the armature shaft so as to bear a thrust load acting on the armature shaft as a whole, thereby avoiding the local concentration of impact on the bearing to ensure a desired lifetime of the bearing.

5 Claims, 4 Drawing Sheets

ROTARY ELECTRIC MACHINE EQUIPPED WITH BEARING STRUCTURE PROVIDING ENHANCED RESISTANCE TO THRUST LOAD

CROSS REFERENCE TO RELATED DOCUMENT

The present application claims the benefit of Japanese Patent Application No. 2005-118212 filed on Apr. 15, 2005, the disclosure of which is incorporated herein by reference.

BACKGROUND OF THE INVENTION

1. Technical Field of the Invention

The present invention relates generally to a rotary electric machine which is equipped with an armature producing torque when subjected to an electromagnetic force and may be used in an automotive engine starter, and more particularly to such a rotary electric machine designed to have a bearing structure with enhanced resistance to thrust load.

2. Background Art

Japanese Patent First Publication No. 11-141443 teaches a starter motor, as illustrated in FIG. 5, which has an armature shaft 100 retained at an end thereof rotatably by a bearing mount 121 formed on an end frame 120 through a bearing 110.

The bearing 110 is implemented by a plain bearing (also called sleeve bearing) and press-fit within the bearing mount 121. The armature shaft 100 is placed in contact of a journal surface thereof with an inner surface of the bearing 110. The bearing 110 has a flange 111 extending in a radius direction from an end thereof facing a communator 130. The flange 111 is placed in direct contact with a rear end of the commutator 130 to bear a thrust load transmitted from an armature.

When the armature is pressed backward (i.e., rightward as viewed in the drawing) during cranking of the engine, it may cause the rear end of the commutator to hit the flange 111 of the bearing 110, so that a thrust load acts on the flange 111. The flange 111 is deformed elastically to absorb most of such impact. Long use of the starter motor will, therefore, cause the flange 111 of the bearing 110 to experience a large number of impacts, so that it may suffer from physical damage.

SUMMARY OF THE INVENTION

It is therefore a principal object of the invention to avoid the disadvantages of the prior art.

It is another object of the invention to provide a rotary electric machine equipped with a bearing structure having enhanced resistance to thrust load to ensure a desired lifetime thereof.

According to one aspect of the invention, there is provided a rotary electric machine which may be employed as an electric motor in an engine starter for automotive vehicles. The rotary electric machine comprises: (a) a housing including an end frame; (b) an electric motor disposed within the housing, the motor including an armature and an armature shaft, the armature being to be subjected to an electromagnetic force to provide torque to the armature shaft; (c) a plain bearing made of a hollow cylindrical wall which has an axial length between opposed ends thereof and retains an end portion of the armature shaft along the axial length; and (d) a hollow bearing mount formed on the end frame within which the plain bearing is mounted. The bearing mount supports the plain bearing in abutment with one of the ends of the axial length of the plain bearing so as to have the axial length of the plain bearing bear a thrust load transmitted from the armature shaft. Specifically, the bearing is designed to dampen or absorb, as a whole, physical impact exerted on the armature shaft, thereby avoiding local concentration of the impact on the bearing to improve the lifetime thereof.

In the preferred mode of the invention, the bearing mount has an inner shoulder formed on an inner wall thereof. The inner shoulder works to support the plain bearing in abutment with the one of the ends of the axial length. This structure permits a portion of the bearing mount other than supporting the bearing to have an increased thickness, thus enhancing the rigidity of the bearing mount.

The end frame may alternatively have an end wall defining a bottom of the bearing mount which supports the plain bearing in abutment with the one of the ends of the axial length. This structure permits the end frame to be made to have substantially the same structure as a conventional one.

The bearing mount may also support the plain bearing in abutment with the one of the ends of the axial length of the plain bearing through an annular spacer. The use of the spacer enables use of various types of plain bearings having different lengths.

Another of the ends of the axial length of the bearing may extend outside an open end of the bearing mount through which the end portion of the armature shaft is inserted. This avoids a direct hit of the armature shaft on the bearing mount.

The end portion of the armature shaft may be smaller in diameter than a major portion of the armature shaft to form an outer shoulder between the end portion and the major portion. The bearing is placed in abutment of another of the ends of the axial length with the outer shoulder of the armature shaft.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 2:
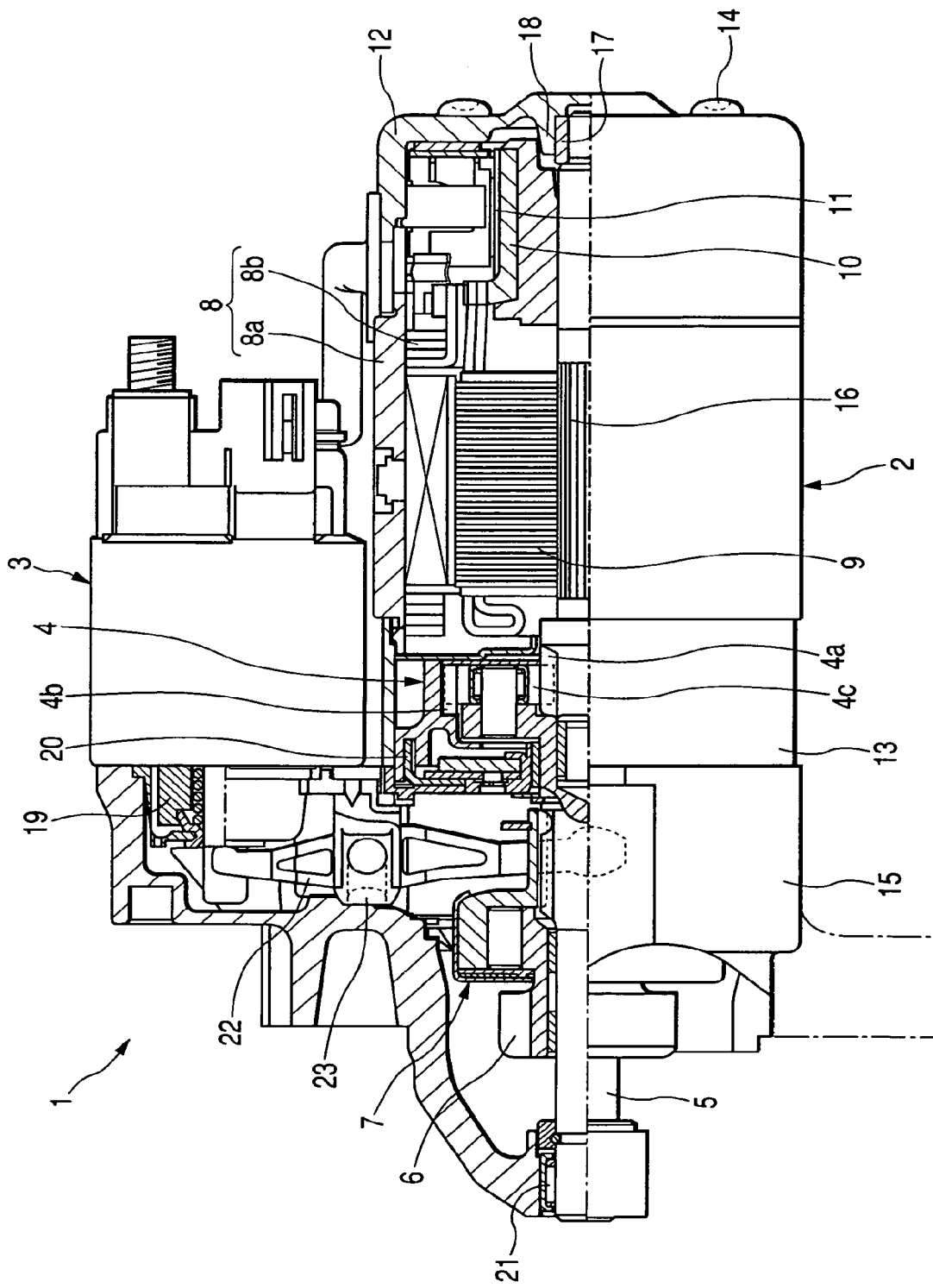
FIG. 2 is a partial longitudinal sectional view which shows an engine starter in which a rotary electric machine of the first embodiment is built.

Referring to the drawings, wherein like reference numbers refer to like parts in several views, particularly to FIG. 2, there is shown an automotive engine starter 1 according to the first embodiment of the invention.

The starter 1 consists essentially of a rotary electric machine designed as an electrical motor 2, a solenoid switch 3, an output shaft 5, a speed reducer 4, a pinion gear 6, and a clutch 7. The solenoid switch 3 works to close main contacts connected to a motor power circuit called main circuit to energize the motor 2. The output shaft 5 is coupled with the motor 2 through the speed reducer 4. The pinion gear 6 is fitted on the output shaft 5. The clutch 7 works to selectively transmit the torque of the output shaft 5 to the pinion gear 6.

The motor 2 is a dc motor which includes a field system 8, an armature 9 disposed inside the field system 8 to be rotatable, a commutator 10 joined to the armature 9, and brushes 11 riding on the commutator 10. When the main contacts are closed by the solenoid valve 7, it will cause an electric current to be supplied from a storage battery (not shown) installed in the vehicle to energize the armature 9, so that it produces torque.

The field system 8 is made up of a yoke 8a working to form a magnetic circuit and a plurality of field coils 8b disposed on an inner periphery of the yoke 8a at equi-intervals in a circumferential direction of the yoke 8a. Instead of the field coils 8b, permanent magnets may be used. The yoke 8a is of a hollow cylindrical shape and has opposed openings closed by an end frame 12 and a center casing 13 to define a housing of the motor 2. The end frame 12 and the center casing 13 are in spigot joint with the yoke 8a. The end frame 12, the center casing 13, and the yoke 8a are coupled together by screwing through bolts 14 from the rear of the end frame 12 into a front housing 15.

The armature 9 has an armature shaft 16 which is retained at an end thereof by a bearing 17, as will be described later in detail, fitted in a bearing mount 18 of the end frame 12 and at the other end by the center casing 13 through the speed reducer 4.

The solenoid switch 3 includes an excitation coil (not shown) to be excited by the power supplied from the battery upon closing of a starter switch (not shown) by a vehicle operator and a plunger 19 movable inside the excitation coil. When the excitation coil is energized by closing of the starter switch, it will produce magnetic attraction to pull the plunger 19 to close the main contacts of the main circuit of the motor 2. Alternatively, when the excitation coil is denergized, the magnetic attraction disappears, so that the plunger 19 is moved backward by a return spring (not shown) to open the main contacts.

The speed reducer 4 is implemented by a typical epicycle reduction gear train (also called a planetary gear speed reducer) and made up of a sun gear 4a, an internal gear 4b, and planet gears 4c. The sun gear 4a is formed on the end of the armature shaft 16. The internal gear 4b is limited in speed by a torque limiter, as will be described later. The planet gears 4c are placed in mesh with the gears 4a and 4b.

The torque limiter has a rotary disc 20 retained frictionally. The rotary disc 20 is coupled with the internal gear 4b. In operation, addition of excessive torque to the internal gear 4b which is greater than holding torque thereof will cause the rotary disc 20 of the torque limiter to slip against the friction, thereby permitting the internal gear 4b to rotate to absorb the excessive torque.

The output shaft 5 is arranged coaxially in alignment with the armature shaft 16 and connected at an end thereof to the armature shaft 16 through the speed reducer 4 and at the other end to the front housing 15 through the bearing 21 to be rotatable.

The pinion gear 6 is constructed integrally with the clutch 7. When it is required to start the engine, the output shaft 5 is moved away from the motor 2 (i.e., the leftward in FIG. 2) into mesh with a ring gear (not shown) joined to the engine. The clutch 7 is joined to the outer periphery of the output shaft 5 through a spline to be movable along the output shaft 5 and also coupled with the plunger 19 of the solenoid switch 3 through a shift lever 22.

The shift lever 22 is retained by a lever holder 23 to be swingable to transmit longitudinal movement (i.e., lateral movement, as viewed in FIG. 2) of the plunger 19 to the clutch 7.

The structure of the bearing 17 will be described below in detail.

Figure 1:
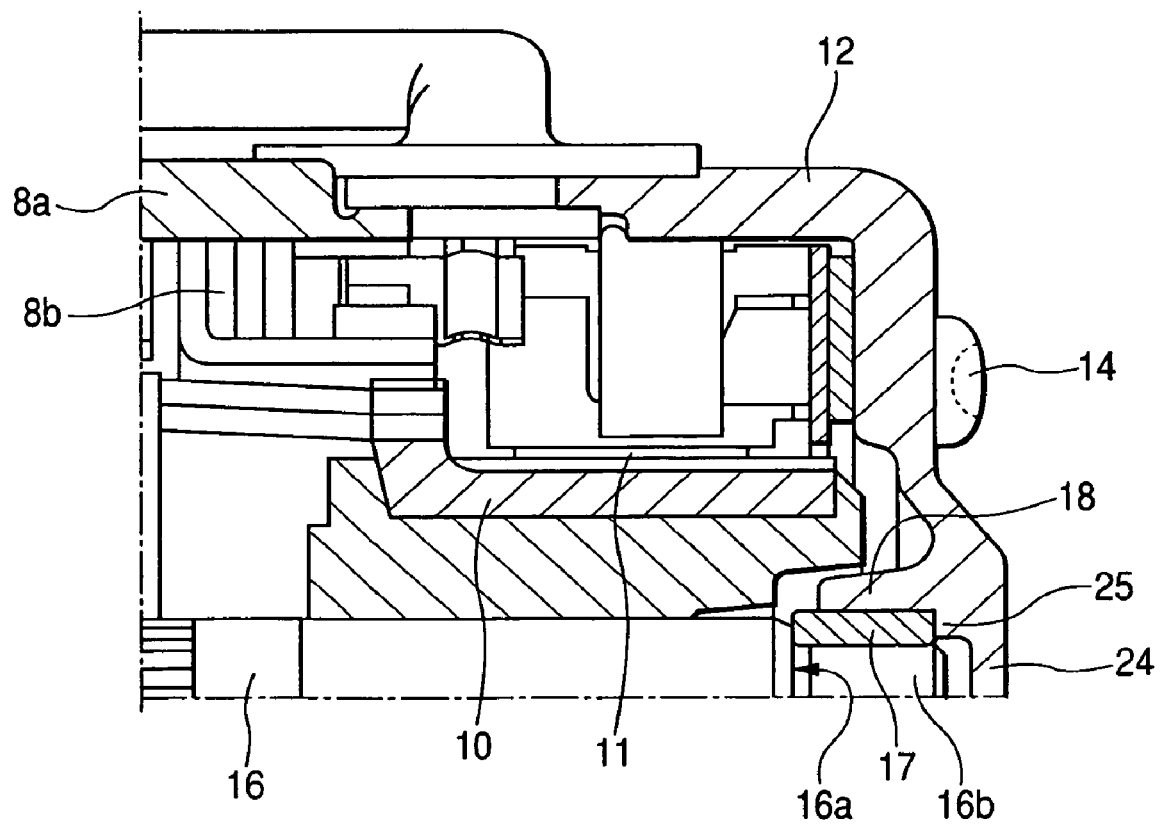
FIG. 1 is a partial sectional view which shows a bearing structure of a rotary electric machine according to the first embodiment of the invention which is designed to retain an armature shaft rotatably and absorb thrust load acting on the armature shaft effectively.

The structure of the end frame 12 retaining the bearing 17 will first be discussed. The end frame 12, as illustrated in FIG. 1, has an end wall 24 defining a rear end thereof in an axial direction of the motor 2. The end wall 24 has formed on an inner surface thereof an annular bearing mount 18 extending in the axial direction of the motor 2. The bearing mount 18 has an inner shoulder 25 extending over the whole of circumference of an inner wall thereof. The inner shoulder 25 works as a stopper to position or hold the bearing 17 in place.

The bearing 17 is, as can be seen from FIG. 1, a plain bearing (also called sleeve bearing) made of a hollow cylinder and press-fit in the bearing mount 18 in abutment of an end thereof (i.e., a right end in the drawing) with the inner shoulder 25. The bearing 17 has the other end (i.e., a left end in the drawing) which extends from the bearing mount 18 inwardly of the end frame 12 (i.e., toward the armature 9) so as to face an outer shoulder 16a of the armature shaft 16. Specifically, the bearing 17 has an axial length between the opposed ends which extends parallel to the length of the armature shaft 16 and is placed in surface-to-surface contact both with the inner wall of the bearing mount 18 and with the armature shaft 16.

The armature shaft 16 has a small-diameter head 16b inserted into the bearing 17. The small-diameter head 16b is smaller in outer diameter than a major body of the armature shaft 16. The outer shoulder 16a is formed between the major body of the armature shaft 16 and the small-diameter head 16b. The armature shaft 16 is retained by the bearing 17 to be slightly movable in a lengthwise direction thereof. When the armature shaft 16 is moved fully rearward (i.e., rightward in FIG. 1), the outer shoulder 16a abuts the end of the bearing 17.

In operation of the starter 1, when the starter switch is closed to energize the excitation coil of the solenoid switch 3, it will cause the plunger 19 to be magnetically attracted rightward, as viewed in FIG. 2, to swing the shift lever 27, thereby transmitting the movement of the plunger 19 to the clutch 7. This causes the clutch 7 to be moved away from the motor 2 along the output shaft 5 together with the pinion gear 6 until the end surface of the pinion gear 6 hits the end surface of the ring gear of the engine.

Afterwards, the plunger 19 continues to be attracted and closes the main contacts of the main circuit of the motor 2. The motor 2 is supplied with power from the battery, so that the armature 9 undergoes an electromagnetic force, as produced by the field coil 8b, and produces torque. The torque is increased in magnitude by the speed reducer 4 and transmitted to the output shaft 5 and to the pinion gear 6 through the clutch 7. When the pinion gear 6 has reached an angular position where the pinion gear 6 is meshable with the ring gear, the pinion gear 6 is thrust into engagement with the ring gear. Upon completion of engagement of the pinion gear 6 with the ring gear, the torque is transmitted from the pinion gear 6 to the ring gear to crank the engine.

When, after start-up of the engine, the starter switch is opened, the excitation coil of the solenoid switch 3 is deenergized so that the magnetic attraction disappears, and the plunger 19 is moved backward (i.e., leftward in FIG. 2) by the return spring. This causes the main contacts of the motor 2 to be opened to stop the supply of power to the motor 2. The motor 2 stops rotating the armature 9. The backward movement of the plunger 19 also causes the clutch 7 to be pulled backward by the shift lever 22 to bring the pinion gear 6 into disengagement from the ring gear. The pinion gear 6 moves toward the motor 2 along the output shaft 5 together with the clutch 7.

The motor 2, as already described, has the bearing 17 placed in abutment of one of the ends of the axial length thereof with the inner shoulder 25 of the bearing mount 18. Therefore, when the armature shaft 16 undergoes physical impact during cranking of the engine and is pressed in the axial direction thereof so that it hits the end of the bearing 17, the bearing 17 works as an impact damper as a whole to dampen or absorb such a thrust load. Specifically, the axial length of the bearing 17 functions to absorb the thrust load exerted from the armature shaft 16 through the elasticity of the bearing 17 and thus has an enhanced resistance to the thrust load, thereby resulting in an increased lifetime of the bearing 17.

The bearing 17 extends partially outside the bearing mount 18, thereby avoiding hitting of the armature shaft 16 against the bearing mount 18 of the end frame 18.

Figure 5:
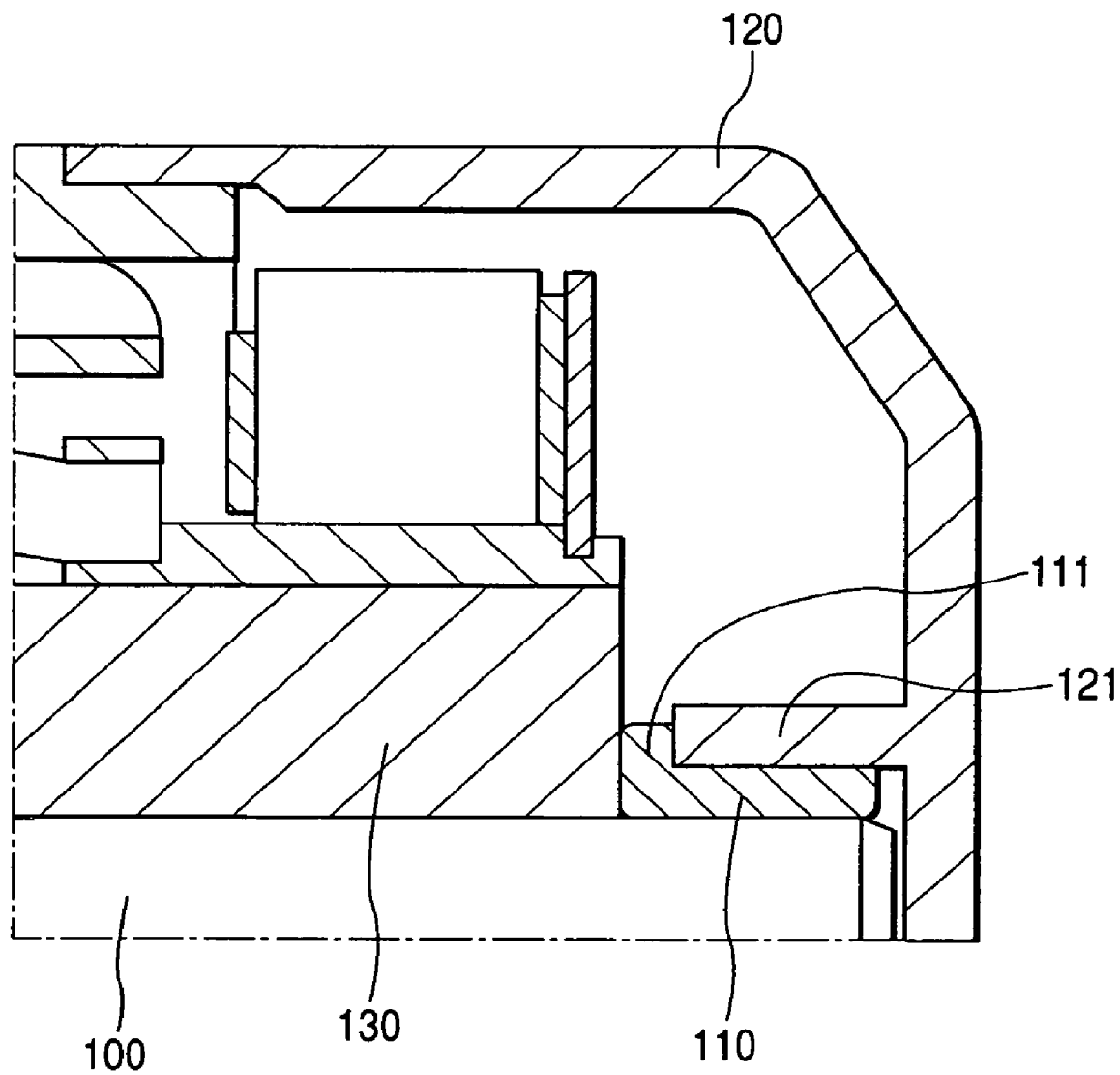
FIG. 5 is a partial sectional view which shows a bearing structure of a conventional rotary electric machine.

The bearing 17 is made of a sleeve and simple in structure which does not have a protrusion such as the flange 111 in FIG. 5, thus resulting in a decrease in production cost thereof. The bearing mount 18 has formed on the inner wall of the end frame 12 the inner shoulder 25 on which the end of the bearing 17 is seated and which works to hold the bearing 17 from moving backward (i.e., the rightward in FIG. 1). This structure permits the bearing mount 18 to have a thick portion closer to the end wall 24 than the inner shoulder 25, thereby ensuring the rigidity of the end frame 12 which is great enough to withstand the impact arising from hitting of the armature shaft 16 on the bearing 17.

Figure 3:
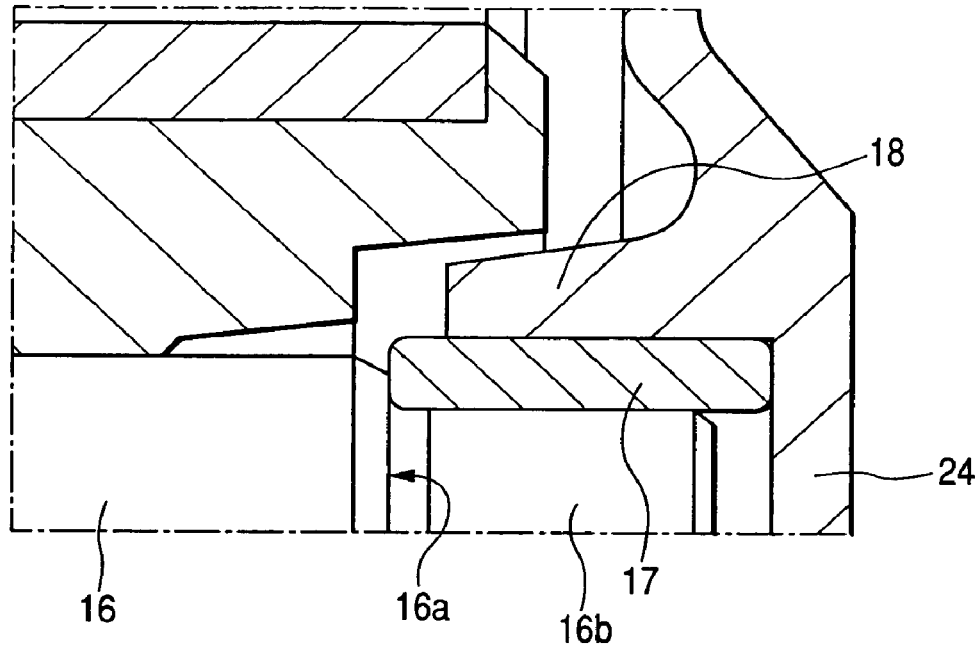
FIG. 3 is a partial sectional view which shows a bearing structure of a rotary electric machine according to the second embodiment of the invention.

FIG. 3 shows major parts of the motor 2 according to the second embodiment of the invention.

The bearing mount 18 does not have the inner shoulder 25 and has an inner wall extending straight to the bottom thereof (i.e., the end wall 24 of the end frame 12). The bearing 17 is fitted within the bearing amount 18 in abutment of the end thereof with the inner surface of the end wall 24 of the end frame 12. The bearing 17 is longer in length than that in the first embodiment, as illustrated in FIG. 1. This structure of the end frame 12 eliminates the need for an additional means for holding the bearing 17 in the axial direction of the motor 2, thus permitting the end frame 12 to have substantially the same structure as that of conventional starters. Other arrangements of the starter 1 are identical with those in the first embodiment, and explanation thereof in detail will be omitted here.

Figure 4:
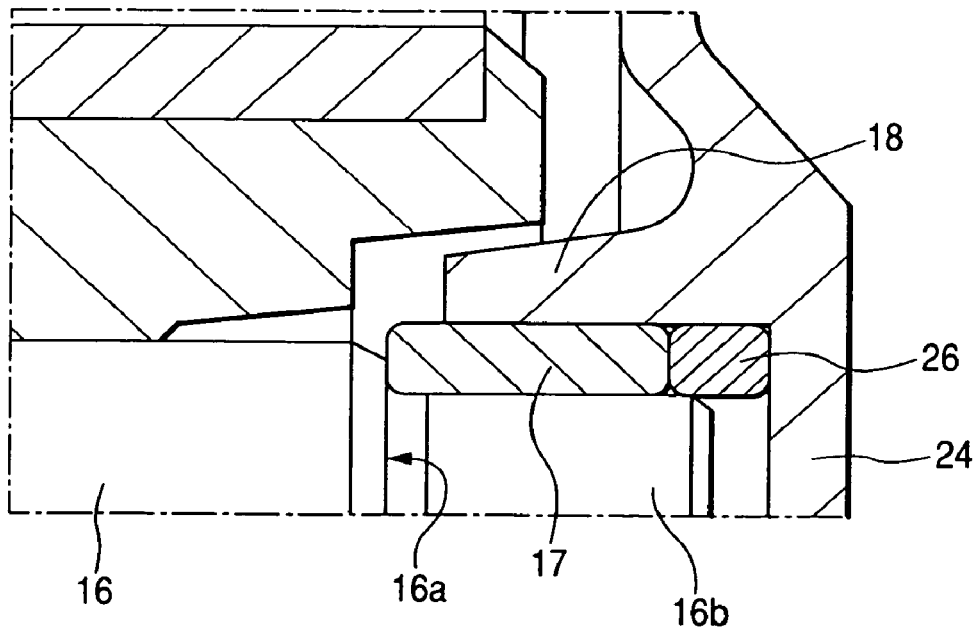
FIG. 4 is a partial sectional view which shows a bearing structure of a rotary electric machine according to the third embodiment of the invention.

FIG. 4 shows major parts of the motor 2 according to the third embodiment of the invention.

An annular spacer 26 is disposed between the end of bearing 17 and the inner surface of the end wall 24 of the end frame 12. Specifically, the bearing 17 is disposed within the bearing mount 18 in abutment with the spacer 26 and held from moving in the rightward axial direction, as viewed in the drawing. This structure of the end frame 12, like the second embodiment, eliminates the need for an additional means for holding the bearing 17 in the axial direction of the motor 2. The use of the spacer 26 enables use of various types of plain bearings having different lengths.

Other arrangements of the starter 1 are identical with those in the first embodiment, and explanation thereof in detail will be omitted here.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A rotary electric machine comprising:
   a housing including an end frame;
   an electric motor disposed within the housing, the motor including an armature and an armature shaft, the armature being subjected to an electromagnetic force to provide a torque to the armature shaft;
   a plain bearing comprising a hollow cylindrical wall that has an axial length between opposed ends of the hollow cylindrical wall and retains an end portion of the armature shaft along the axial length; and
   a hollow bearing mount formed on the end frame within which the plain bearing is mounted, the hollow bearing mount supporting the plain bearing in abutment with one of the opposed ends of the axial length of the plain bearing so as to have the axial length of the plain bearing bear a thrust load transmitted from the armature shaft,
   wherein the other of the ends of the axial length of the plain bearing extends outside an open end of the bearing mount through which the end portion of the armature shaft is inserted,
   wherein the bearing mount has an inner shoulder formed on an inner wall of the bearing mount, the inner shoulder supporting the plain bearing in abutment with the one of the opposed ends of the axial length, and
   wherein the end portion of the armature shaft is smaller in diameter than a major portion of the armature shaft to form an outer shoulder between the end portion and the major portion, and wherein the plain bearing is placed in abutment by another of the ends of the axial length with the outer shoulder of the armature shaft.

2. The rotary electric machine according to claim 1, wherein the end frame has an end wall defining a bottom of the bearing mount that supports the plain bearing in abutment with the one of the ends of the axial length.

3. The rotary electric machine according to claim 1, wherein the bearing mount supports the plain bearing in abutment with the one of the ends of the axial length of the plain bearing through an annular spacer.

4. The rotary electric machine according to claim 1, wherein the rotary electric machine is used in an engine starter.

5. The rotary electric machine according to claim 1,
   wherein the armature shaft has an outer shoulder between the end portion and a major portion of the armature shaft, and
   wherein the other of the ends of the axial length of the plain bearing is in abutment with the outer shoulder of the armature shaft.

* * * * *